K. YAMASHITA.
CARPET BEATER.
APPLICATION FILED JAN. 20, 1916.
1,181,945.
Patented May 2, 1916.
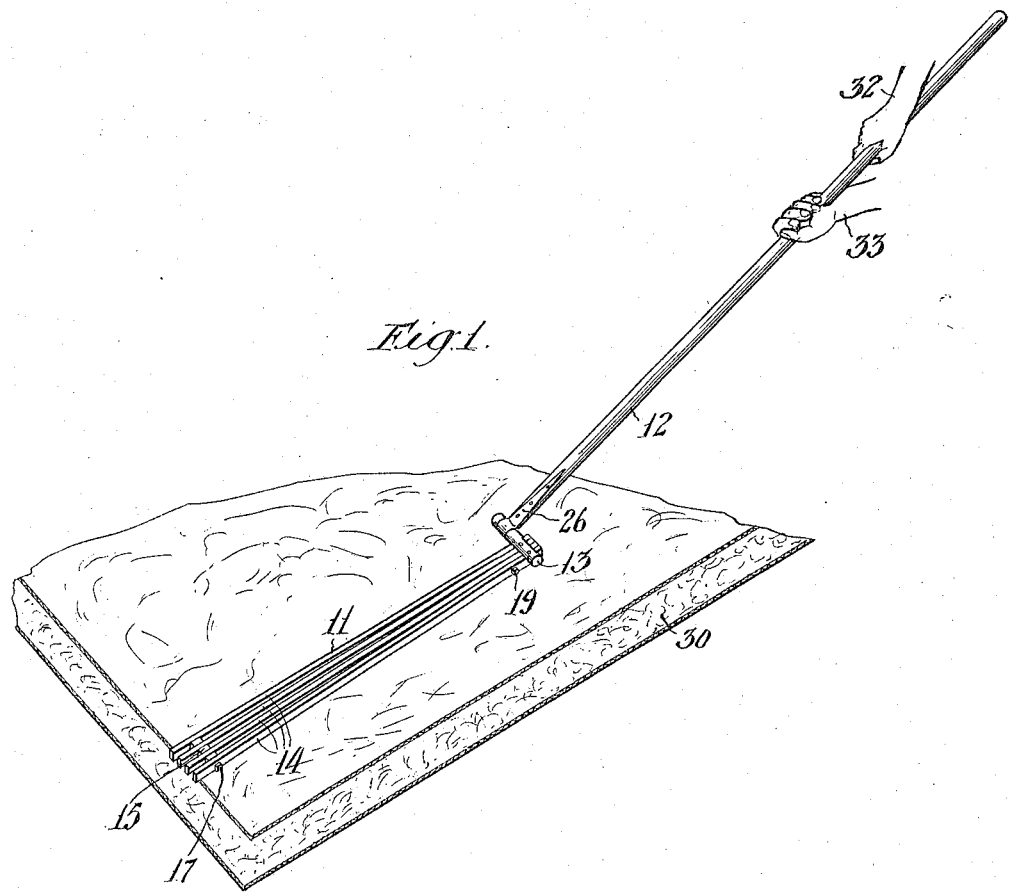
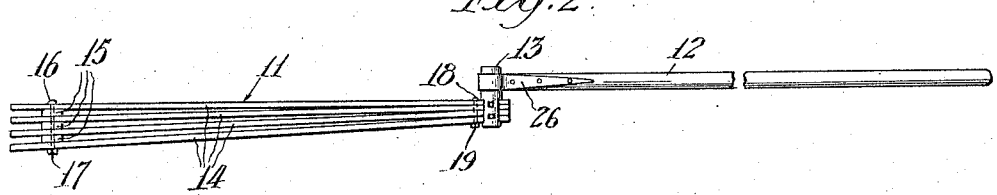
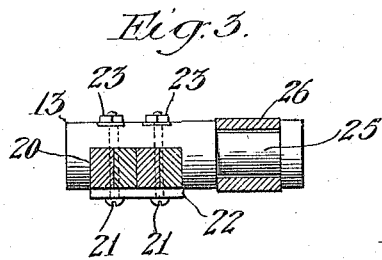
Inventor
Kame Yamashita
by Townsend, Graham + Hawn
his Attorneys

UNITED STATES PATENT OFFICE.

KAME YAMASHITA, OF LOS ANGELES, CALIFORNIA.

CARPET-BEATER.

1,181,945.　　　　Specification of Letters Patent.　　　Patented May 2, 1916.

Application filed January 20, 1916.　Serial No. 73,264.

*To all whom it may concern:*

Be it known that I, KAME YAMASHITA, a subject of the Emperor of Japan, residing at Los Angeles, in the county of Los Angeles and State of California, have invented a new and useful Carpet-Beater, of which the following is a specification.

My invention relates to carpet beaters.

It is common practice to beat carpets by laying them upon the ground, and my invention is especially adapted to beat carpets in this manner.

Referring to the drawing which is for illustrative purposes only: Figure 1 is a perspective view of the carpet beater in operation. Fig. 2 is a plan view showing the particular construction. Fig. 3 is an enlarged view showing the method of fastening and journaling the pivot pin.

Broadly considered the carpet beater consists of a paddle 11, a handle 12, and a pivot pin 13. The paddle 11 consists of a series of paddle strips 14, these strips being separated at one end by spacing blocks 15, the spacing blocks 15 and the paddle strips 14 being clamped together by means of a bolt 16 having a nut 17. The paddle strips 14 are secured together at the opposite ends by means of a clamping bolt 18 having a nut 19. The paddle strips 14 are secured in a notch 20 cut in the pivot pin 13, the paddle strips being secured in place by means of two pivot bolts 21, these bolts passing through a plate 22, and having nuts 23 thereon. The pivot pin 13 has an annular groove 25 formed thereon, this annular groove being engaged by a bent metal strap 26 which is secured to the handle 12. The bent metal strap 26 is of such a shape that it forms a cylindrical bearing opening about the pivot pin 13.

In Fig. 1, 30 represents a portion of the carpet to be cleaned, and 32 and 33 represent the hands of the user.

The method of operation is as follows: The carpet being placed on the ground, the user of the beater swings the paddle 11 in a circle about the center of the pivot pin 13, throwing it downwardly against the carpet as shown in Fig. 1. By making the paddle of light strips spread in the shape of a fan a comparatively wide beating surface is produced without excessive weight, and by mounting the paddle 11 so that it is restrained to move in a certain plane about the pivot pin it is possible for the operator to cause the beater to strike flat against the surface of the carpet. The fan shaped form of beater also permits the escape of dust and dirt from between the strips.

I claim as my invention:—

1. A carpet beater comprising a handle, a bent strap secured to the end of said handle and forming with the end of said handle a cylindrical bearing opening, a flat paddle formed of a plurality of paddle strips rigidly secured in fan like relation with each other, a cylindrical pivot pin, and means for securing said paddle strips rigidly to said pivot pin, said pivot pin having an annular groove cut therein of such a size as to fit loosely in said cylindrical bearing opening in said bent strip.

2. A carpet beater comprising a handle, a paddle formed of a series of paddle strips secured in fan like relation to each other, a pivot pin rigidly secured to said paddle, and means for pivoting said pivot pin to said handle.

In testimony whereof, I have hereunto set my hand at Los Angeles, California, this 14th day of January, 1916.

KAME YAMASHITA.

Copies of this patent may be obtained for five cents each, by addressing the "Commissioner of Patents, Washington, D. C."